(12) United States Patent
Kapaan et al.

(10) Patent No.: US 6,585,834 B1
(45) Date of Patent: *Jul. 1, 2003

(54) METHOD FOR PERFORMING A HEAT TREATMENT OF METALLIC RINGS, AND BEARING RING THUS OBTAINED

(75) Inventors: Hendrikus Jan Kapaan, Nieuwegein (NL); Cornelis Noorlander, Nieuwegein (NL); Jan Thure Slycke, Bilthoven (NL); Mats Johan Persson, Amsterdam (NL); Barbara Lynne Tozier, Ann Arbor, MI (US)

(73) Assignee: SKF Engineering and Research Centre B.V., Nieuwegien (NL)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/446,728
(22) PCT Filed: Jul. 10, 1998
(86) PCT No.: PCT/NL98/00400
§ 371 (c)(1),
(2), (4) Date: Feb. 9, 2000
(87) PCT Pub. No.: WO99/02744
PCT Pub. Date: Jan. 21, 1999

(30) Foreign Application Priority Data

Jul. 10, 1997 (NL) .............................................. 1006539

(51) Int. Cl.[7] .............................................. C21D 9/40
(52) U.S. Cl. ........................ 148/589; 148/639; 148/906; 148/644; 148/646
(58) Field of Search ................................. 148/639, 589, 148/906, 644, 646, 647; 266/117, 259

(56) References Cited

U.S. PATENT DOCUMENTS

| | | | |
|---|---|---|---|
| 3,720,987 A | * 3/1973 | Dubost | ..................... 29/148.4 |
| 5,401,006 A | 3/1995 | Canner | |
| 5,452,882 A | * 9/1995 | Wunning | ..................... 266/251 |
| 5,997,661 A | * 12/1999 | Matsumoto et al. | ........ 148/316 |

FOREIGN PATENT DOCUMENTS

| | | |
|---|---|---|
| DE | 42 08 485 C 1 | 2/1993 |
| EP | 0 282 822 A1 | 9/1988 |

(List continued on next page.)

OTHER PUBLICATIONS

"ASM Handbook: Vol. 4 Heat Treating", ASM International, 1991, p106.*

Primary Examiner—George Wyszomierski
Assistant Examiner—Janelle Combs Morillo
(74) Attorney, Agent, or Firm—Oliff & Berridge, PLC

(57) ABSTRACT

A method of performing a heat treatment on steel rings, in particular for bearings, whereby the outer surface and inner surface of a preheated ring are exposed to different flows of a cooling medium such that the regions of the ring adjacent those surfaces are subjected to different cooling processes. The flow supply of the cooling medium is controlled in such a way that a desired internal stress pattern is obtained in the ring. The cooling medium includes of a combination of liquid and gas. An apparatus for performing a heat treatment on steel rings includes a support means for a ring to be treated; first and second supply means for supplying a spray or mist of a liquid, gas or combination thereof to the outer surface or inner surface of the ring, control means for controlling the supply of the spray or mist is also disclosed.

13 Claims, 3 Drawing Sheets

FOREIGN PATENT DOCUMENTS

| | | |
|---|---|---|
| EP | 0 446 425 A1 | 9/1991 |
| FR | 2 593 192 | 7/1987 |
| JP | 54-163706 A * | 12/1979 |
| JP | 57 174415 A | 10/1982 |
| JP | 58 110619 | 7/1983 |
| JP | 59-059835 A * | 4/1984 |
| JP | 61 235509 | 10/1986 |
| JP | 09-329139 A * | 12/1997 |

* cited by examiner

METHOD FOR PERFORMING A HEAT TREATMENT OF METALLIC RINGS, AND BEARING RING THUS OBTAINED

The invention is related to a method for performing a heat treatment on steel rings, in particular for bearings, whereby the outer surface and the inner surface of a preheated ring are exposed to different flows of a cooling medium such that the regions of the ring adjacent those surfaces are subjected to different cooling processes.

A method of this kind is known from laid-open Japanese patent application (SHO) 61-235509. By means of this method, a bearing ring can be manufactured the inner and outer surfaces of which have different hardnesses. For this purpose, a steel ring is partially quench-hardened by subjecting one surface thereof to a coolant spray. At the same time, the other surface is subjected to a flow of compressed air. Thereby, said outer surface obtains a hardness corresponding to the quenching process, whereas the inner surface is allowed to obtain a hardness corresponding to a tempering process.

Although this prior art method offers some improvement in the mechanical properties of bearing rings, its useful application is limited. In particular, said process is intended to offer improvements in bearings to be used in a mast roller of a fork lift device, wherein the outer surface of the outer ring is in rolling contact with a mast rail.

The purpose of the invention is to offer a general heat treatment method for producing rings, in particular for bearings of any type, which have a much broader application. In the normal process of manufacturing such bearing rings, in a first step a ring is cut from a tube or forged from a suitable steel material. According to a further possibility, such ring may be formed by a cold rolling and hot forming process. Subsequently, said rings are subjected to a turning operation, and then they are heat treated.

The heat treatment entails the heating of the rings to a temperature of about the austenitizing temperature, then performing a quenching operation in order to obtain a martensite structure, and finally tempering.

In this process, the ring in question becomes distorted as a result of which the shape and the size of the rings changes and for instance its out-of-roundness increases. In order to make the ring suitable for use in a bearing, its dimensions should be restored within narrow tolerances, which entails a costly grinding operation.

The changes in size of the steel material can be predicted in a reasonable way based on experience. These changes result inter alia from the change in volume which occurs during the martensite transition process upon quenching. In contrast, the changes in the shape of the rings are less predictable. These changes result from "inhomogeneities" in the rings, such as in their chemical composition, microstructures, possible decarburization and deformations.

However, the main variations in shape result from differences in residual stresses. Finally, the shape of the rings is influenced by plastic deformations before and during heat treatment and after quenching.

The object of the invention is therefore to provide a method by means of which the variations in shape of the rings can be controlled in a more reliable way. This object is achieved by controlling the flow supply in such a way that a desired internal stress pattern is obtained in said ring by controlling the propagation of phase transformation from austenite to martensite or bainite structure.

The flows of the cooling medium, such as a coolant spray or mist, which both are controlled accurately, are now used for establishing a stress pattern in the ring which gives rise to less distortions. In particular, for manufacturing a ring for a bearing having a raceway on one of its surfaces, the spray or mist supply to said surfaces is controlled in such a way that compression stresses are obtained in the surface zone at the raceway.

The compression stresses near the raceway, which are balanced by tensile stresses near the other surface of the ring, also have a positive influence on the behaviour of the ring under rolling contact with the rollers, in that the development of cracks which would result from rolling contact fatigue is thereby inhibited.

The method according to the invention can be further improved by clamping the ring in axial direction, the clamping force being controlled in such a way that out-of-roundness as a result of the cooling processes is minimised.

In order to control the manufacturing process accurately, the surface temperature of at least one surface is measured.

The cooling medium, such as a spray or mist, can be formed by water and air at a suitable temperature, e.g. in the rage of 0–50 degrees C and at an overpressure. Both surfaces of the rings can be handled simultaneously by a mixture of a coolant, such as water and/or air.

During this process, the ring can be rotated about its axis at an angular speed in the range of 0–200 revolutions per minute.

As mentioned, the spray or mist supply is controlled in such a way that a martensite microstructure of the steel material is obtained; at the same time, the clamping force exerted in axial direction is controlled in relation to the temperature drop of the ring to generally below the martensite transition temperature. Thus, the flows of spray or mist are controlled according to a predetermined cooling curve in the phase diagram.

The invention is also related to a steel bearing ring, manufactured by the method described before, wherein the region adjacent the surface for the raceway of the ring contains compressive stresses and the opposite region contains tensile stresses according to a desired stress pattern.

The invention is furthermore related to an apparatus for performing a heat treatment on steel rings, comprising a support means for a ring to be treated, first and second supply means for supplying a spray or mist of a liquid, gas or combination thereof to the outer surface respectively the inner surface of the ring, and control means for controlling the supply of spray or mist so as to obtain a desired internal stress pattern in the ring at ambient temperature.

Said apparatus also comprises support means having a fixture for axially clamping the ring.

The fixture comprises an upper die and a lower die, which by means of cylinder/piston devices can be moved towards each other so as to clamp a ring, which lower die is supported rotatably with respect to their axes by means of bearings.

The clamping force exerted by the cylinder/piston devices, and the rotational speed of the dies is controlled by the control means.

A short summary of the invention is given below.

The cooling process is controlled by computer with two individual operating closed loops. One loop is dedicated to controlling the temperature on the outside surface, and one loop is dedicated to control the inside surface temperature of the ring.

Before the actual cooling process is started, the required temperature—time curves for the inside and outside diameter of the ring are entered into the computer as a few typical temperature-time set-points. The curves in between these set-points are calculated by the computer to obtain the two curves that completely describe the cooling curves for the inside and outside diameter of the ring. During the cooling process, the temperature of the ring is measured both on the inside and the outside diameter by means of two non-contacting temperature measuring devices. The signals of these devices are used for feedback to the controllers. The controllers on their turn adjust the water flow to the inside and outside nozzles dependant on differences between the actual measured temperatures compared to the required temperature according to the temperature set-point curves. The airflow to the nozzles can be kept at a constant level or can be made dependant of the water flow.

Since the temperature set-point curve for the inside diameter and outside diameter are completely independent of each other, it is possible to vary the cooling rate on the inside diameter independent of the outside diameter during the course of the cooling process. This is essential for being able to control the stress profile pattern through the ring cross section in a reproducible way.

The invention will further be described with reference to the figures.

Figure 3:
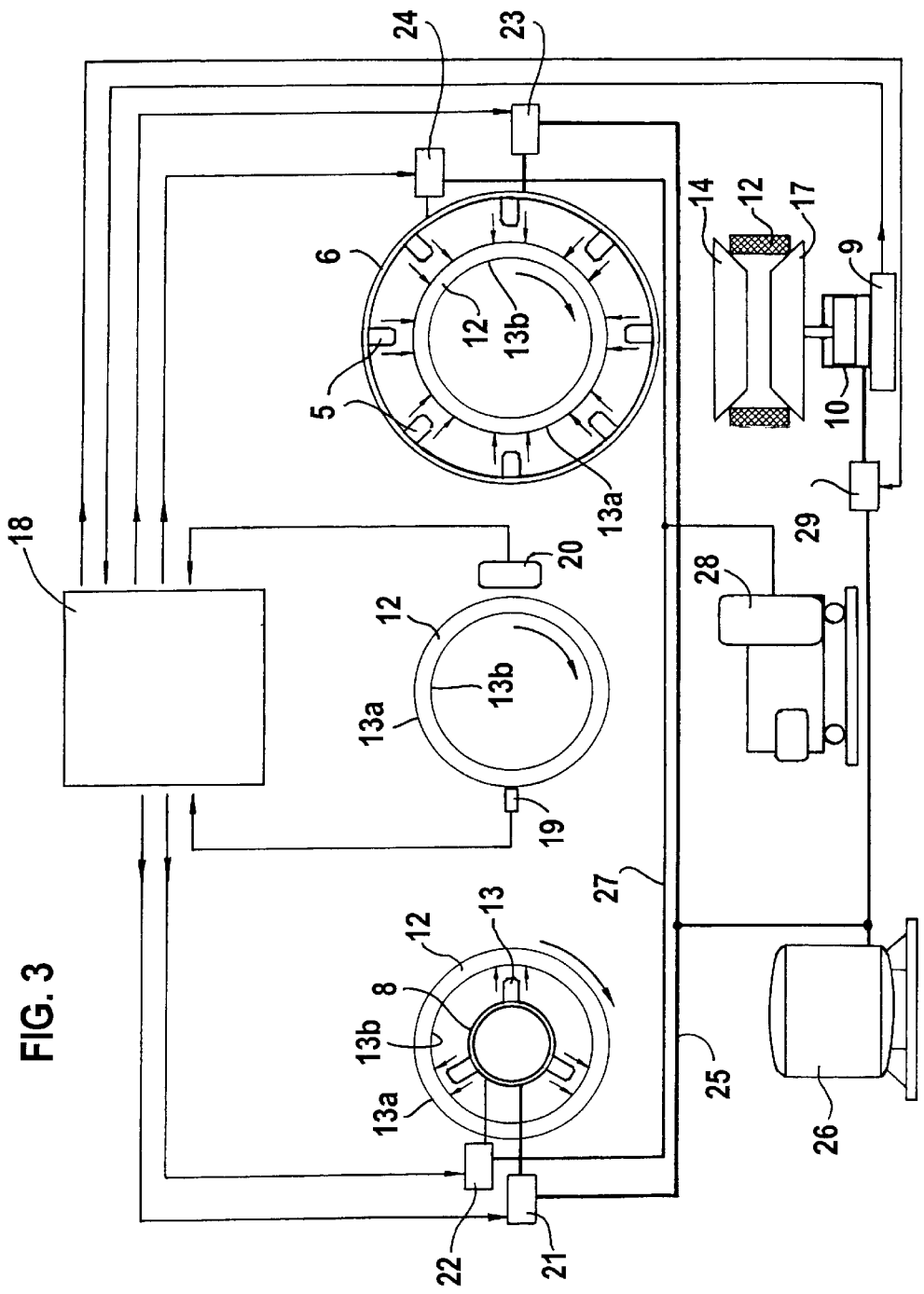

FIG. 3 gives an overview of the control system for the device according to the invention.

Figure 4:
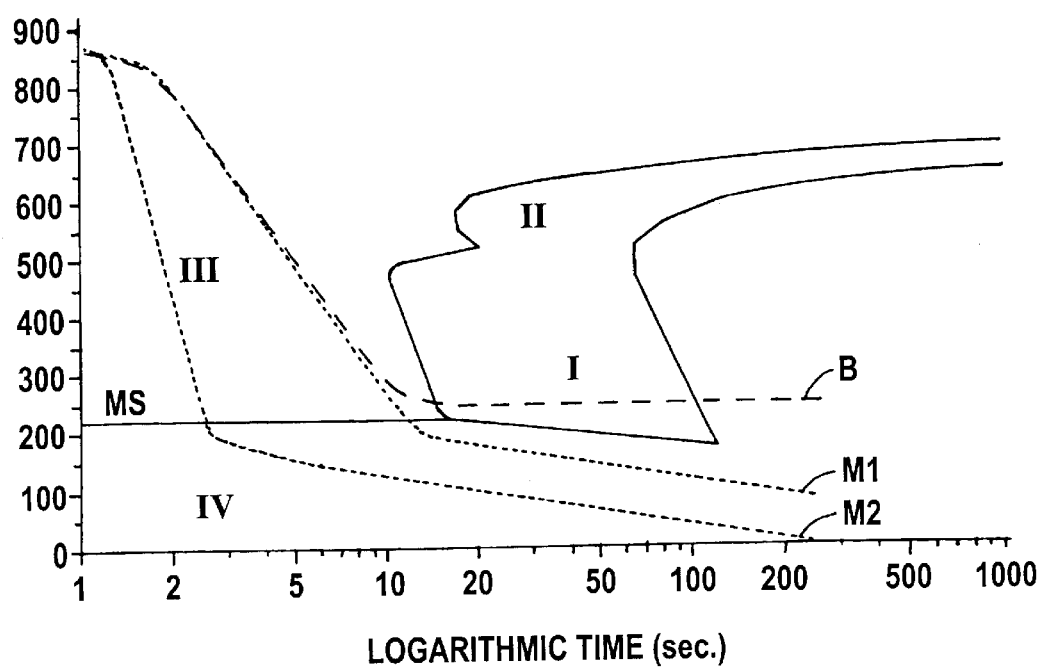

FIG. 4 shows a continuous cooling transformation diagram obtained by the device and method according to the invention.

Figure 1:
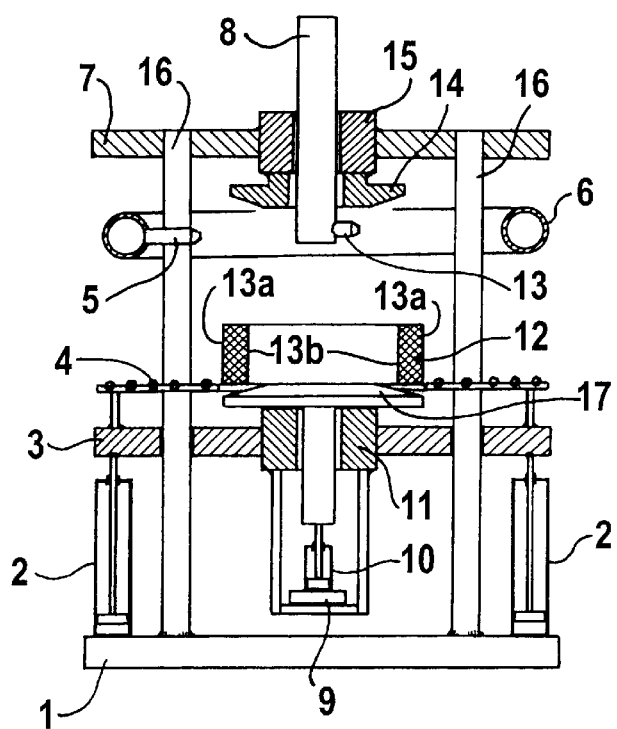
FIG. 1 shows a device for performing the method according to the invention, at the stage of positioning a ring.
Figure 2:
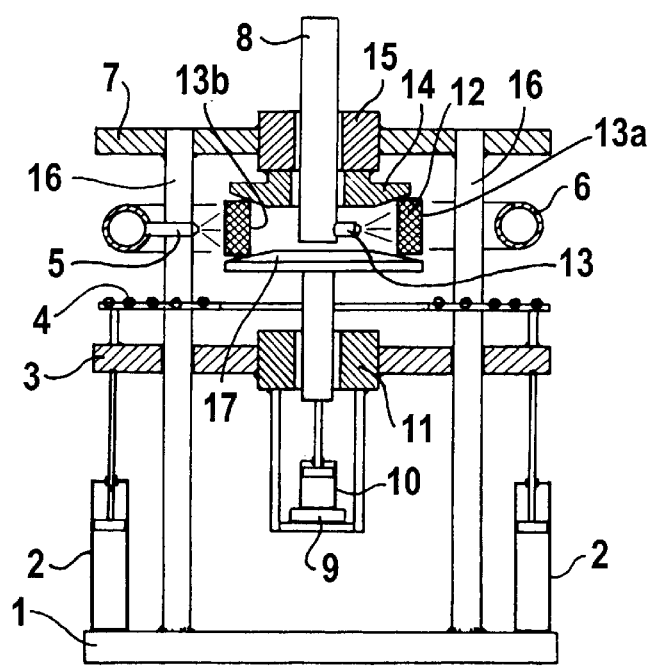
FIG. 2 shows the device according to FIG. 1 in operation.

The device in FIGS. 1 and 2 comprises a base 1, supporting pneumatic cylinder/piston devices 2 as well as fixed columns 16. At the top of the cylinder/piston devices 2, a lower frame 3 is mounted, carrying a lower die 17, which by means of a further cylinder piston device 10 is movable upwardly and downwardly with respect to the frame 3.

To the upper end of columns 16, an upper frame 7 is mounted, which carries a fixed upper die 14. The columns 16 furthermore carry a supply ring 16 provided with a number of radially inwardly directed spray nozzles 5. Through the upper frame 7 and the upper die 14, a supply tube 8 extends, the lower end of which is provided with a radially outwardly directed spray nozzle 13.

In operation, a ring of steel material 12 is placed on the lower die 17, which is still in its lower position. Subsequently, the hydraulic piston/cylinder devices 2 and 10 are operated, in such a way, that the upper edge of ring 12 becomes clamped between the lower die 17 and the upper die 14. By means of pressure sensor 9, positioned between the lower end of piston/cylinder device 10 and frame part 11 of lower frame 3, the clamping force exerted on the ring 12 can be controlled.

The lower die 17 and upper die 14 are accommodated in bearing 11,15, such that upon activation of a drive motor (not show), these dies 17,14, together with the ring 12 are brought in rotaion. Furthermore, a mixture of water and air under pressure is supplied to tube 6 and 8, in such a way that a controlled flow of coolened water/air mixture is sprayed onto a raceway on either the outer surface 13a and the inner surface 13b of ring 12.

As shown in the schematic representation of FIG. 3, the device according to FIGS. 1 and 2 is operated under computer control of computer 18. This computer contains suitable programmers for spraying the raceway of either the inner 13a and outer surface 13b of ring 12. Information about the temperature of the ring 12 is fed to control unit 18, as measured by contacting thermocouple or a non-contacting sensor 20.

Computer 18 controls the valves 21, 22 respectively 23, 24 for regulating the supply of water respectively air towards the nozzles 5 and 13. The valves 21, 23 are fed, via line 25, from an air buffer 26; valves 22, 24 are fed, via line 27, from a water buffer 28.

Moreover, the control unit 18 controls valve 29 for regulating the pressure in piston/cylinder device 10, and thereby for regulating the clamping force exerted on ring 12 by lower die 17 and upper die 14.

By programming control unit 18 in a suitable way, any cooling/quenching procedure for the ring 12 can be simulated. For instance, even though water and air are used as an (environmentally friendly) cooling medium, an oil cooling curve can be obtained by simply controlling the valves 21–24 in the desired way.

During this process, distortions of the ring are minimized by exerting the desired axial clamping force of ring 12 by means of lower die 17 and upper die 14, also under control of control unit 18.

As mentioned, the spray quenching apparatus is capable of following predefined cooling curves on the ring outer and inner surfaces, respectively. By carefully selecting the cooling characteristics for the outer and inner diameter of the ring, the resulting microstructure and residual stress pattern can be controlled. This will now be explained also with respect to the CCT (Continuous Cooling Transformation) diagram in FIG. 4.

In this figure, region I denotes Austenite+Bainite, II denotes Austenite+Pearlite, III denotes Austenite+Carbide and IV denotes Martensite+Carbide (+Austenite).

EXAMPLE 1

Curve M1 represents the cooling curve for the outer diameter and curve M2, for the inner diameter of a bearing inner ring. By a more intensive cooling on the inner diameter to a temperature level around the martensite start temperature (Ms), followed by slow, but controlled, cooling to room temperature, the martensite transformation progresses in a controlled way through the ring wall. This quenching procedure gives a more advantageous residual stress pattern (less tensile or even compressive stresses) in the raceway region of the inner ring, facilitating a longer bearing service life. For outer rings, the cooling procedure would be the reverse for the inner and outer surfaces, respectively.

EXAMPLE 2

Curve B represents a cooling path to produce a bainitic microstructure. After a controlled quenching to the bainite transformation temperature, a balanced heat transfer (cooling to remove transformation heat or heating to compensate for heat losses to the surrounding, depending on the actual conditions) is maintained during sufficient time to complete the bainite transformation). This cooling curve will only generate low residual stresses.

What is claimed is:

1. Method for performing a heat treatment on steel rings, comprising
   1) exposing the outer surface and the inner surface of a preheated ring to different flows of a cooling medium, consisting of a combination of liquid and gas independently controlled, such that the regions of those surfaces are subjected to different cooling processes;
   2) controlling the flow supply of the cooling medium in such a way that a desired internal stress pattern is obtained in said ring by controlling the propagation of phase transformation from austenite to martensite or bainite material structure;

3) clamping the ring in an axial direction in its inner diameters;
4) controlling the clamping force in such a way that out-of-roundness as a result of the cooling processes is kept to a minimum; and
5) controlling the clamping force exerted in axial direction in relation to the temperature drop of the ring to generally below the martensite transition temperature.

2. Method according to claim 1 for manufacturing a ring for a bearing having a raceway on one of its surfaces, whereby the cooling medium supply to said surfaces is controlled in such a way that compression stresses are obtained near the surface for the bearing raceway.

3. Method according to claims 1,2, whereby the clamping force is controlled in a prescribed range.

4. Method according to claim 1, whereby the surface temperature of at least one surface is measured so as to control the cooling process(es).

5. Method according to claim 1, whereby the cooling medium is a spray or mist formed by a combination of water and air, air or a combination-thereof at a temperature in the range of 0–50 degrees C. and at a defined overpressure.

6. Method according to claim 1, whereby the ring and nozzles are rotated about the axis of the ring at a relative speed in the range of 0–200 revolutions per minute.

7. Method according to claim 1, whereby the cooling medium supply is controlled in such a way that a martensite microstructure or bainite of the steel material is obtained.

8. Method according to any of claim 1, whereby the flows of cooling medium are controlled according to a predetermined cooling curve in the transformation diagram.

9. Method according to claim 1, whereby the cooling process is controlled in such a way that a desired internal stress pattern is obtained.

10. Method according to claim 1, comprising the steps of selecting a first desired cooling curve in the temperature-time domain for the inner surface of a ring, selecting a desired second desired cooling curve in the temperature-time domain for the outer surface of a ring, measuring the instantaneous temperatures of said inner and outer surfaces, controlling the flow of coolant for the inner surface and the flow of coolant for the outer surface on the basis of said first and second desired cooling curves and said measured temperatures.

11. Method according to claim 10, comprising the step of varying the flow of liquid.

12. Method according to claim 11, comprising the step of maintaining the flow of gas at an essentially constant level.

13. Method according to claim 11, wherein said liquid comprises water and said gas comprises air.

* * * * *